(12) United States Patent
Asfour et al.

(10) Patent No.: US 8,208,185 B2
(45) Date of Patent: Jun. 26, 2012

(54) METHOD AND APPARATUS FOR THE PRODUCTION OF POLARIZATION HOLOGRAMS

(75) Inventors: Jean-Michel Asfour, Weinheim (DE);
Stephan Schneider, Münster (DE);
Dietmar Eberhard, Kenzingen (DE);
Wolfgang Riedel, Freiburg (DE);
Dominik Giel, Freiburg im Breisgau (DE); Stephan Völkening, Köln (DE);
Hardy Jüngermann, Düsseldorf (DE)

(73) Assignee: Bayer Innovation GmbH, Duesseldorf (DE)

( * ) Notice: Subject to any disclaimer, the term of this patent is extended or adjusted under 35 U.S.C. 154(b) by 785 days.

(21) Appl. No.: 12/278,908

(22) PCT Filed: Jan. 31, 2007

(86) PCT No.: PCT/EP2007/000808
§ 371 (c)(1),
(2), (4) Date: Feb. 26, 2009

(87) PCT Pub. No.: WO2007/090546
PCT Pub. Date: Aug. 16, 2007

(65) Prior Publication Data
US 2009/0219590 A1    Sep. 3, 2009

(30) Foreign Application Priority Data
Feb. 9, 2006  (DE) .......................... 10 2006 005 860

(51) Int. Cl.
*G03H 1/26*  (2006.01)
*G03H 1/04*  (2006.01)

(52) U.S. Cl. ............................................ 359/22; 359/35
(58) Field of Classification Search ................. 359/3, 9, 359/22, 35; 430/1, 2; 369/103
See application file for complete search history.

(56) References Cited

U.S. PATENT DOCUMENTS

| | | | |
|---|---|---|---|
| 5,173,381 A | | 12/1992 | Natansohn et al. |
| 5,384,221 A | * | 1/1995 | Savant et al. .................... 430/19 |
| 5,496,670 A | | 3/1996 | Hvilsted et al. |
| 5,543,267 A | | 8/1996 | Stumpe et al. |
| 5,641,846 A | | 6/1997 | Bieringer et al. |
| 5,888,842 A | | 3/1999 | Chu et al. |
| 6,046,290 A | | 4/2000 | Berneth et al. |
| 6,376,655 B1 | | 4/2002 | Berg et al. |
| 6,423,799 B1 | | 7/2002 | Berneth et al. |
| 6,875,833 B2 | | 4/2005 | Berneth et al. |

(Continued)

FOREIGN PATENT DOCUMENTS

DE    4208328    9/1993

(Continued)

OTHER PUBLICATIONS

International Search Report for PCT/EP2007/000808, mailed Jul. 3, 2007.

(Continued)

*Primary Examiner* — Alessandro Amari
(74) *Attorney, Agent, or Firm* — Baker, Donelson, Bearman, Caldwell & Berkowitz, PC

(57) ABSTRACT

The present invention relates to a method for the production of polarization holograms, an apparatus for the production of polarization holograms and the use of the polarization holograms according to the invention as data stores, security features or diffractive optical elements for performing conventional optical functions.

21 Claims, 2 Drawing Sheets

U.S. PATENT DOCUMENTS

| | | | |
|---|---|---|---|
| 7,018,684 | B2 | 3/2006 | Berneth et al. |
| 7,214,752 | B2 | 5/2007 | Berneth et al. |
| 7,315,501 | B1 | 1/2008 | Ramanujam et al. |
| 2003/0183959 | A1 | 10/2003 | Berneth et al. |
| 2003/0191240 | A1 | 10/2003 | Berneth et al. |
| 2005/0070678 | A1 | 3/2005 | Berneth et al. |

FOREIGN PATENT DOCUMENTS

| | | |
|---|---|---|
| DE | 19620588 | 11/1997 |
| DE | 19926698 | 12/2000 |
| EP | 0425088 A2 | 5/1991 |
| EP | 0 622 789 A1 | 11/1994 |
| EP | 1 028 359 A1 | 8/2000 |
| JP | 7231133 A | 8/1995 |
| WO | WO 92/02930 | 2/1992 |
| WO | WO 99/57719 | 11/1999 |

OTHER PUBLICATIONS

Hvilsted, S. et al., "Azobenzene Side-Chain Liquid Crystalline Polyesters with Outstanding Optical Storage Properties," Turkish Journal of Chemistry, vol. 22, No. 1, Mar. 1998, Doc. XP-002435433, pp. 33-45.

Ramanujam, P.S. et al., "Polarisation-Sensitive Optical Elements in Azobenzene Polyesters and Peptides," Optics and Lasers in Engineering, vol. 44, No. 9, Sep. 2006, Doc. XP-005399883, pp. 912-925.

Hossfeld, J. et al., "Polarizing Computer-Generated Holograms," Optical Engineering, vol. 32, No. 8, Aug. 1993, Doc. XP-000387836, pp. 1835-1837.

Xu, Fang et al., "Polarization-Selective Computer-Generated Holograms: Design, Fabrication, and Applications," Applied Optics, vol. 34, No. 2, Jan. 10, 1995, Doc. XP-000486687, pp. 256-266.

Hagen, Rainer et al., "Photoadressable Polymers for Optical Data Storage," Advance Materials, vol. 13, No. 23, Dec. 3, 2001, Doc. XP-001129599, pp. 1805-1810.

Xie, S. et al., "Recent Developments in Aromatic Azo Polymers Research," Chem. Mater, vol. 5, No. 4, 1993, American Chemical Society, pp. 403-411.

Anderle, Klaus et al., "Laser-Induced Reorientation of the Optical Axis in Liquid-Crystalline Side Chain Polymers," Makromol. Chem., Rapid Commun., No. 10, 1989, pp. 477-483.

Gerchberg, R.W. et al., "A Practical Algorithm for the Determination of Phase from Image and Diffraction Plane Pictures," Optik, vol. 35, No. 2, 1972, pp. 237-243.

* cited by examiner

METHOD AND APPARATUS FOR THE PRODUCTION OF POLARIZATION HOLOGRAMS

CROSS REFERENCE TO RELATED APPLICATIONS

This application is a §371 National Stage Application of PCT/EP2007/000808 filed Jan. 31, 2007 which claims priority from German Application 10 2006 005 860.7 filed Feb. 9, 2006, the content of which is incorporated by reference.

BACKGROUND OF THE INVENTION

1. Field of the Invention

The present invention relates to a method for the production of polarization holograms, an apparatus for the production of polarization holograms and the use of the polarization holograms according to the invention as data stores, security features or diffractive optical elements for performing conventional optical functions.

2. Description of Related Art

A computer-generated hologram (CGH) is a digital hologram. The structures of the CGH are calculated with the use of special algorithms, which simulate the holographic recording process in the computer, on a virtual sampling grating. These structures are then transferred to a material carrier, for example by lithographic methods.

In contrast to CGH, in the classical, analogue recording methods the holographic structures are produced by interference, i.e. phase-constant superposition of laser beams.

An advantage of CGH is that it is possible to produce holograms of non-real, computer-calculated objects or object images which are present as a mathematical description. The use of CGH thus increases the flexibility in the production of diffraction structures compared with the analogue approach. Furthermore, the design of a writing device for digital holograms is more robust than that for analogue holograms since it is not necessary to take into account a time-constant phase coupling of at least two laser beams.

Computer-generated holograms are widely used, for example for interferometric shape testing of workpieces, for the production of security elements for protection from forgery and as diffractive optical elements (DOE) for performing conventional optical functions (lenses, prisms).

Methods for producing CGH and the use thereof as security elements are part of the prior art and are described, for example, in DE 19 926 698 A1. These are phase or amplitude holograms.

Polarization holograms are a special form of holograms which have been produced to date by analogue techniques, i.e. by interference of laser beams. A pattern of polarization directions is produced by superposition of laser beams and is fixed in an optically anisotropic material.

Particularly in security elements, polarization holograms have some advantages over the conventional established phase or amplitude holograms. For example, a polarization hologram is sensitive to the direction of rotation of a circularly polarized read beam; a polarization hologram diffracts right and left circularly polarized light in different directions (P. Rochon, V. Dronyan, A. Natansohn: *Polarization Holographic Gratings in Azopolymers for Detecting and Producing Circularly Polarized Light*, submitted for publication in *International Conference on Applications of Photonics Technology* (*SPIE*), Technical Report No. 48, Office of Naval Research, Grant: N00014-93-1-0615, R&T Code: 3132081). A polarization hologram therefore provides greater protection from forgery.

A material which can store the polarization direction of a write beam is required for transferring a GCH to a medium for the production of a polarization hologram. This is not possible with the customary materials to which CGH are usually transferred. Furthermore, in the usual lithographic transfer of CGH to a material carrier, a permanent diffraction structure which cannot be modified is produced. The transfer of the CGH into a re-writable medium is substantially more flexible.

Both aspects are fulfilled by so-called photoaddressable polymers. Photoaddresable polymers are known (*Polymers as Electrooptical and Photooptical Active Media*, V. P. Shibaev (editor), Springer Verlag, New York 1995). These substances are characterized by the ability to form oriented birefringence on exposure to polarized light. The birefringence patterns written in can be made visible in polarized light. The examples of this type are the side group polymers according to U.S. Pat. No. 5,173,381 which contain azobenzene groups.

It is furthermore known that localized birefringence can be written into layers of these polymers at any desired point using polarized light, the preferential axis of which birefringence moves on rotation of the direction of polarization (K. Anderle, R. Birenheide, M. Eich, J. H. Wendorff, *Makromol. Chem., Rapid Commun.* 10, 477-483 (1989)).

EP0622789 A1 describes how the writing of photoaddressable polymers can be generally effected: Order states are generated in a polymer layer by the influence of actinic light. Preferably used light is linearly or circularly polarized light, the wavelength of which is in the region of the absorption band of the photoinducibly configuration-changing side groups. On incidence of polarized light along the surface normal of a film, the result is a preferential orientation in the plane of the film, which is uniform throughout the film in the case of linearly polarized light, whereas the preferential direction is periodically modified according to the electric vector of the excitation light along the surface normal with the use of circularly polarized light. Exposure to unpolarized light produces a preferential orientation perpendicular to the plane of the film.

EP 0 622 789 A1 furthermore states that photoaddressable polymers are particularly suitable for the processing of images and for information processing by means of holograms, the reproduction of which can be effected by illumination with a reference wave. In the laid-open application, a hologram is produced by superposing two phase-constant light sources in the storage material.

It is furthermore stated that, in the case of analogue storage, the values of the grey scale can be adjusted continuously and with positional resolution.

The production of polarization holograms by writing a digitized pattern of polarization directions is not described.

Polarization holograms which are written by an analogue write technique into photoaddressable polymers are part of the prior art. An apparatus with which polarization holograms can be written into photoaddressable polymers by superposition of two circularly polarized laser beams is described in the application WO 99/57719 A1 (page 10, line 1 to page 14, line 16). With the apparatus, however, it is not possible to write computer-generated polarization holograms directly into photoaddressable polymers.

DE 19 620 588 A1 describes a method differing from the abovementioned methods and intended for writing into photoaddressable polymers.

In a generative first process, a layer of a photoaddressable polymer is illuminated over the whole area with a light source for polarized light and anisotropic birefringence is thus produced. In a second step, the material thus prepared is illuminated with short light pulses and the anisotropy produced over the whole area is changed in localized regions. The writing of computer-generated polarization holograms is not described.

SUMMARY OF THE INVENTION

It was therefore the object to develop a method by means of which polarization holograms can be calculated and can be transferred using a write system to a material carrier.

Surprisingly, it was found that this object is achieved by the below-described method according to the invention and the apparatus according to the invention for producing polarization holograms.

The invention firstly relates to a method for the production of polarization holograms. The method according to the invention for the production of polarization holograms comprises, in a first step, calculating a polarization hologram which has at least two polarization stages and, in a second step, transferring the calculated polarization hologram to a material carrier comprising a substance in which oriented birefringence can be produced locally by light.

DETAILED DESCRIPTION OF A PREFERRED EMBODIMENT

Calculation of the Polarization Hologram

Figure 1:
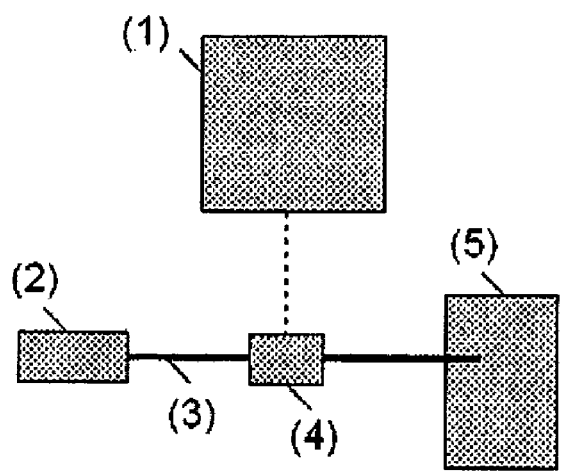
FIG. 1 describes an apparatus for production of a polarization hologram according to the present invention.

The object is described in three-dimensional space by a complex quantity which is composed of amplitude and phase. The amplitude of the object is a distribution of brightness values (amplitude distribution), the phase of the object can be arbitrarily chosen. A random distribution is preferably chosen.

The object to be stored holographically is present in digitized form, i.e. a matrix of discrete values for amplitude and phase is present.

Polarization holograms are a special form of phase hologram; the phase hologram for the object is therefore calculated. For this purpose, it is necessary to find a phase hologram which reconstructs the object on illumination with a read beam. A phase hologram modulates the phase of the read beam. This means that it is necessary to find a phase hologram which modulates the phase of the read beam in a manner such that the amplitude distribution of the object is reconstructed.

The literature describes a number of approaches for a solution; the *Iterative Fourier Transformation Algorithm* (IFTA) described by Gerchberg & Saxton is to be considered as an example (R. W. Gerberg, W. O. Saxton; A Practical Algorithm for the Detection of Phase from Image and Diffraction Plane Pictures; Optik 35 (1972), page 237). The aim of the algorithm is to find a representation of an object in frequency space which is as free of errors as possible.

DEFINITIONS

A(O) Amplitude of the object
P(O) Phase of the object
A(C) Amplitude of the CGH
P(C) Phase of the CGH
A(L) Amplitude of the read beam provided for the read process In the case of Fourier holograms, a Fourier transformation permits the reconstruction of the desired object. In order to produce a Fourier CGH, the complex amplitude/phase distribution in the plane of the hologram is calculated from the object (A(O), P(O)) present in digital form by means of Fourier transformation.

The result is once again a complex amplitude/phase distribution (A(C), P(C)). For the amplitude distribution A(C), the amplitude distribution of the read beam A(L) provided for the read process is used and an inverse Fourier transformation of (A(L), P(C)) is carried out.

The result is an amplitude and phase distribution in the object space (A'(O), P'(O)). This no longer corresponds to the original distribution (A(O), P(O)) since A(C) was replaced by A(L). The phase distribution P'(O) is retained, A'(O) is replaced by A(O) and a further Fourier transformation is carried out.

This is continued until the Fourier transformation of the complex amplitude/phase distribution in the plane of the hologram leads to a complex amplitude/phase distribution in the plane of the object, which distribution agrees with the original distribution A(O), P(O) with sufficient accuracy.

The result is a digital phase hologram having a complex amplitude/phase distribution A(C), P(C) which, on illumination with the read beam, reconstructs the object (A(O), P(O)) with sufficient accuracy.

Essential for this method of calculation is that the algorithm is modified in a manner such that the phase distribution in the plane of the hologram is quantized (so to speak "rounded") at each iteration step in such a way that the calculated polarization hologram has at least two polarization stages. The reason for the quantization is that, for technical reasons, it is not possible to set any arbitrary value for the phase when transferring the calculated polarization hologram to a material carrier. Depending on how many and which discrete values can be set in the material with the technique used, quantization of P(C) is effected. In a preferred embodiment, quantization is effected in such a way that the calculated polarization hologram has four polarization stages.

In the last step of the calculation of the calculated polarization holograms, the values for the phase distribution P(C) are replaced by polarization directions. The phase distribution assumes values between 0 and $2\pi$. These values are mapped to a distribution of polarization directions between 0° and 180°. In the simplest case, linear mapping is carried out, i.e. the values between 0 and $2\pi$ in the phase distribution are replaced linearly by values between 0° and 180°. It is also possible to carry out mappings other than linear ones. It is preferable experimentally to determine a material characteristic which indicates which polarization direction leads to which phase shift.

The iteration of the modified IFTA is as follows:
Step 1: Calculation of A(C) and P(C) from A(O) and P(O) by Fourier transformation
Step 2: Replacement of A(C) by A(L)
Step 3: Quantization of P(C) gives $P_q(C)$
Step 4: Calculation of A'(O) and P'(O) from A(L) and $P_q(C)$ by inverse Fourier transformation
Step 5: Replacement of A'(O) by A(O) and start at 1 with the new values A(O) and P(O); (A(O), P'(O))

The method is terminated when the Fourier transformation of the complex amplitude/phase distribution in the plane of the hologram leads to a complex amplitude/phase distribution in the plane of the object, which distribution corresponds sufficiently accurately to the original distribution A(O), P(O). The result is a calculated phase hologram.

The accuracy of the agreement is determined by the application. If, for example, binary, two-dimensional data codes (matrix codes, such as, for example, the data matrix code) are written as a hologram, the reconstruction must be sufficiently good for the error correction contained in the matrix code to be adequate for enabling the data to be recovered. In the case of holographically stored images, the reconstruction must be sufficiently good for there to be no detectable difference between original and reconstruction to the human eye. Usually, iteration steps are carried out in a number such that the result of the calculation no longer changes at a further iteration step or varies by a mean deviation at each further iteration step.

The calculation of the calculated phase hologram is preferably effected using a computer.

After the calculation of the phase hologram, the above-described replacement of the values for the phase distribution P(C) by polarization distributions is effected. A polarization hologram results.

After the polarization hologram has been calculated, it is transferred to a material carrier in a second step.

Transfer of the Calculated Polarization Hologram to a Material Carrier

If the phase hologram is transferred to a material carrier, it modulates the phase of a read beam. The phase of the read beam can be influenced by the optical path in the material. The optical path (OP) is the product of layer thickness d and the refractive index n of the material:

$$OP = n \cdot d$$

In the case of the conventional phase holograms, as described, for example, in DE19926698 A1, the layer thickness of a material is varied in order to bring about a phase modulation of the read beam.

In the case of the present invention, the refractive index of the material is varied in order to bring about a phase modulation of the read beam.

Material Carrier

All substances in which orientated birefringence can be produced locally by light may be used as material of the material carrier (*Polymers as Electrooptical and Photooptical Active Media*, V P. Shibaev (editor), Springer Verlag, New York 1995; Natansohn et al., *Chem. Mater.* 1993, 403-511). Particularly suitable polymers are those in which oriented birefringence can be produced locally by light. These are referred to here as photoaddressable polymers. These are in particular side group polymers which can be used for the present invention and which are described in the following publications: EP 0 622 789 B1 (pages 3-5), DE 4 434 966 A1 (pages 2-5), DE 19 631 864 A1 (pages 2-16), DE 19 620 588 A1 (pages 3-4), DE 19 720 288 A1 (pages 2-8), DE 4 208 328 A1 (page 3, lines 3-4, 9-11, 34-40, 56-60), DE 10 027 153 A1 (page 2-page 8, line 61), DE 10 027 152 A1 (pages 2-8), WO 196038 410 A1, U.S. Pat. No. 5,496,670 section 1 lines 42-67, section 6 line 22 to section 12 line 20), U.S. Pat. No. 5,543, 267 (section 2 line 48 to section 5 line 3), EP 0 622 789 B1 (page 3, line 17 to page 5, line 31), WO 9202930 A1 (page 6, lines 26 to 35, page 7, line 25 to page 14 line 20), WO 1992002930 A1.

On illumination of the polarization holograms with polarized light, the individual wave trends experience a phase shift. This is dependent on the level of the local birefringence in the storage material. If a so-called photoaddressable polymer is used as storage material, the birefringence can be induced by light (R. Hagen, T. Bieringer: Photoaddressable Polymers for Optical Data Storage. In: Advanced Materials, WILEY-VCH Verlag GmbH (2001), No. 13/23, pages 1805-1810).

Expressed in simple terms, chromophores are oriented perpendicular to the polarization direction as a result of incidence of linearly polarized light.

For writing the calculated hologram into a polarization-sensitive material, linearly polarized light, preferably having a wavelength in the range from 380 nm to 580 nm, is used. Particularly preferably, writing is effected using light having a wavelength of 400 to 420 nm or 500 to 550 nm.

There are two possibilities for transferring calculated polarization holograms to material carriers: serial and parallel writing.

Serial Writing

In order to write a hologram serially, i.e. point by point, the write beam must be capable of travel in two directions. This travel is permitted by a fast mirror tilting system. It consists of a mirror which can be tilted in two angles by two piezoactuators. Alternatively, it is also possible to use two mirrors which in each case can be tilted only in one angle.

In an embodiment of the present invention, the laser beam is fixed and the storage medium is moved in two directions relative to the laser beam. This can be effected, for example, by means of an actuatable displacement table. A combination of mirrors for moving the laser beam and a displacement of the storage medium relative to the laser beam is also conceivable.

The direction of the polarization should be adjustable continuously or discretely in the range from 0 to 180° with at least two polarization stages. Preferably, at least four polarization stages which are equally distributed in the range from 0 to 180° are written.

In order to achieve a sufficiently high write speed, it is necessary to be able to change the polarization direction very rapidly. In an embodiment of the present invention, a design comprising four lasers is used, which is shown schematically in FIG. 2. The advantage of such a design is the avoidance of mechanical components for writing the polarization directions. Each laser produces light having a different polarization direction. The polarization directions are preferably 0°, 45°, 90° and 135°.

Figure 2:
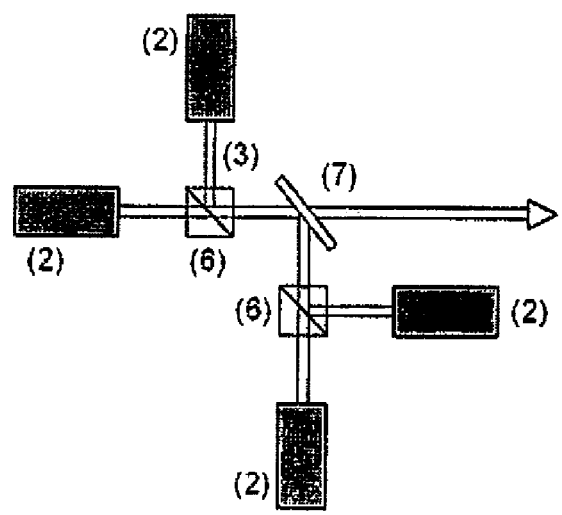
FIGS. 2 and 3 are schematics of suitable designs according to the present invention.
Figure 3:
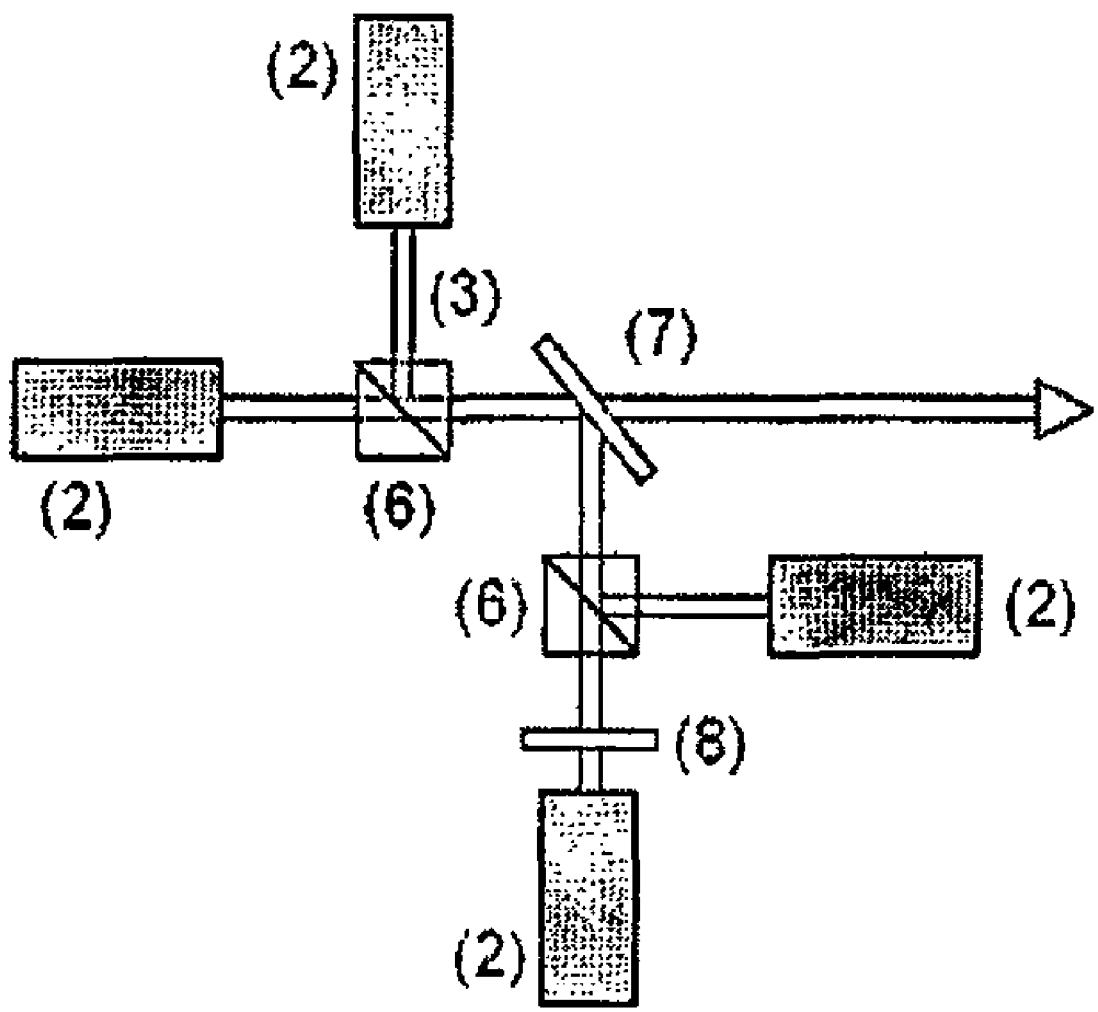

In the write process, the lasers are switched on and off alternately so that the desired polarization direction is present in the collimated exit beam (cf. FIG. 2). In this way, four polarization stages can be written into the material at high speed. With the aid of an additional polarization-rotating π/2 phase shifter (cf. FIG. 3), it is possible to set a further polarization by means of which the storage medium can be "formatted". In a first step, a polarization direction is written over the whole area of the hologram. Thereafter, the additional π/2 phase shifter is removed and, in the second step, the remaining polarization directions are written in the grating mode with the aid of the lasers which can be switched on and off alternately. In this way, holograms having five polarization stages can be written by means of the apparatus described.

Another execution of the invention uses only one laser in which the polarization direction is continually adjustable. For example, a fibre-optic polarization adjuster can be used for this purpose. This operates in a manner equivalent to a refracting flat wave plate of classical optics. The optical fibre is wound into coils. As a result of the curvature of the optical fibre, its cross section is deformed and it becomes elliptical and hence birefringent. By rotation of the coils relative to the continuous optical fibre, it is possible to change the polarization state and to rotate the plane of polarization through the total range.

It is also possible to mount a polarizer in a rotatable manner and thus to rotate the plane of polarization continuously.

In addition to the polarization holograms, even further structures can be written into the material carrier using the laser, such as, for example, special position markers for finding the holograms.

Parallel Writing

In parallel writing, all points of the calculated polarization hologram which have the same polarization are written at the same time into the material carrier. This can be achieved, for example, by means of DLP (digital light processing) technology. DLP technology is based on microscopically small mirrors which are mounted on a DMD chip (digital micromirror device).

The mirrors have two stable end states between which they can change within a very short time. The mirrors are actuated from the outside with the aid of a computer. As a result of the inclination of the individual micromirrors on the DMD chip, the light is either directly reflected to the optical system or conducted to an absorber.

For parallel writing of polarization holograms, a divergent, linearly polarized light beam with adjustable polarization direction is directed at the DMD chip.

The mirrors of the DMD chip represent the pixels of the polarization hologram. All mirrors which belong to the set polarization direction are tilted in the direction of the optical system. All other mirrors are inclined towards the absorber.

Thereafter, a new polarization direction is chosen and the process is continued in an analogous manner until all polarization directions present have been written in.

Alternatively, parallel writing can also be effected using an arrangement of elements by means of which the polarization direction can be set in a controllable manner. In this case, the individual polarization directions present would not need to be written in succession, but all polarization directions present could be written simultaneously side by side. A liquid crystal display could be used as such an arrangement of elements.

The invention furthermore relates to an apparatus for the production of polarization holograms, which comprise (cf. FIG. 1) a calculation unit (1) by means of which the mathematical calculations can be carried out. It furthermore comprises a light source (2) by means of which polarized light (3) having an adjustable polarization direction can be produced. It furthermore comprises a unit (4) by means of which the polarized light can be guided onto a material (5), in particular in such a way that various points in and/or on the material can be illuminated with light of different polarization direction.

A possible embodiment of the apparatus uses a write laser in which the polarization direction can be set at least two stages.

Another possible embodiment of the apparatus uses a plurality of lasers, each of which has at least one different polarization direction, i.e. different lasers are used for the different polarization directions to be written. One laser for each polarization direction to be written. By using π/2 phase shifters, which can be introduced into the beam paths of the lasers and removed again, it is even possible for more polarization directions to be written than lasers are present.

REFERENCE NUMERALS (1) Calculation unit
(2) Light source having an adjustable polarization direction
(3) Light beam having a defined polarization direction
(4) Unit for guiding the light beam onto a material carrier
(5) Material carrier
(6) Beam splitter cube
(7) Beam splitter plate
(8) π/2 phase shifter The present invention furthermore relates to the polarization holograms obtainable by the method according to the invention and the use of these polarization holograms as data stores, security features or diffractive optical elements for performing conventional optical functions, for example lenses or prisms.

The invention claimed is:

1. Method for the production of a polarization hologram, comprising:
    (1) in a first step, calculating a phase hologram having a complex amplitude and phase distribution A(C), P(C);
    (2) in a second step, calculating a polarization hologram from the phase hologram by replacing the values for the phase distribution P(C) by polarization directions; and
    (3) in a third step, transferring the calculated polarization hologram to a material carrier comprising a substance in which oriented birefringence can be produced locally by light.

2. Method according to claim 1 wherein the material carrier comprises a photoaddressable polymer.

3. Polarization hologram, produced by the method according to claim 2.

4. Method according to claim 1, wherein, in addition to the polarization hologram, further structures are written into the material carrier.

5. Polarization hologram, produced by the method according to claim 4.

6. Method according to claim 1, wherein said calculating is effected by an iterative Fourier transformation, and wherein a calculated phase distribution in a plane of the hologram is quantized in each iteration cycle in such a way that the calculated polarization hologram comprises at least two polarization stages.

7. Method according to claim 6, wherein the calculated phase distribution in the plane of the hologram is quantized in each iteration cycle in such a way that the calculated polarization hologram has four polarization stages.

8. Polarization hologram, produced by the method according to claim 7.

9. Polarization hologram, produced by the method according to claim 6.

10. Polarization hologram, produced by the method according to claim 1.

11. A data store comprising a polarization hologram according to claim 10.

12. A security element comprising a polarization hologram according to claim 10.

13. A diffractive optical element for generating special wave front comprising a polarization hologram according to claim 10.

14. Method according to claim 1, wherein, in addition to the polarization hologram, further structures are written into the material carrier.

15. Method according to claim 1, wherein the replacement of values for the phase distribution by polarization directions is done by mapping the values between 0 and 2π to a distribution of polarization directions between 0° and 180°.

16. Polarization hologram, produced by the method according to claim 15.

17. Apparatus for the production of a polarization hologram comprising a calculation unit capable of carrying out mathematical calculations, a light source capable of producing polarized light having an adjustable polarization direction, a unit capable of guiding the polarized light onto a material in such a way that various points in and/or on the material can be illuminated with light of a different polarization direction, and a polarization-rotating $\pi/2$-phase shifter.

18. Apparatus according to claim 17, further comprising a write laser capable of setting polarization direction in at least two stages.

19. Apparatus according to claim 17, wherein a plurality of lasers is used, each of which has at least one different polarization direction.

20. A polarization hologram comprising at least two polarization stages produced using the apparatus of claim 17.

21. Apparatus for the production of a polarization hologram, comprising: a calculation unit capable of carrying out mathematical calculations, a light source capable of producing polarized light having an adjustable polarization direction, wherein said light source is a plurality of lasers each of which has at least one different polarization direction, and a unit capable of guiding the polarized light onto a material in such a way that various points in and/or on the material can be illuminated with light of a different polarization direction.

* * * * *